Aug. 30, 1955
G. W. SCHROEDER
2,716,694
COMBINATION ELECTRIC AND ULTRA-HIGH
FREQUENCY HEATING APPARATUS
Filed June 16 1951
2 Sheets-Sheet 1
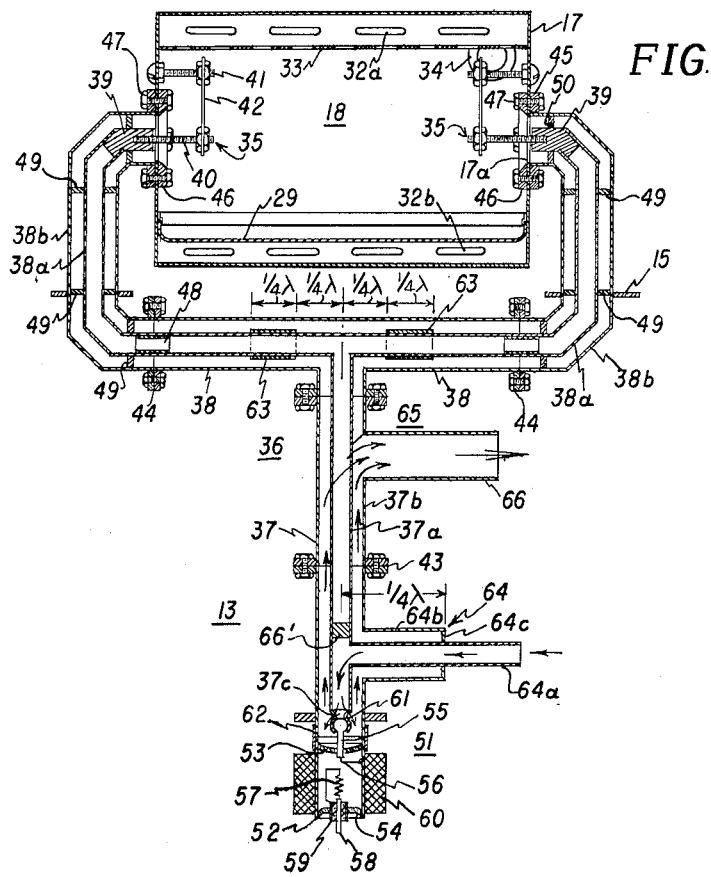
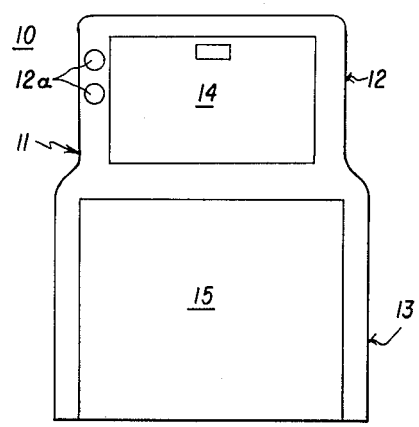
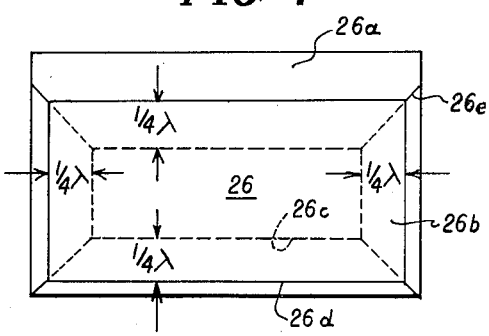
INVENTOR.
George W. Schroeder
BY
*Smith, Olsen + Baird*
Attys.

Aug. 30, 1955
G. W. SCHROEDER
2,716,694
COMBINATION ELECTRIC AND ULTRA-HIGH
FREQUENCY HEATING APPARATUS
Filed June 16 1951
2 Sheets-Sheet 2
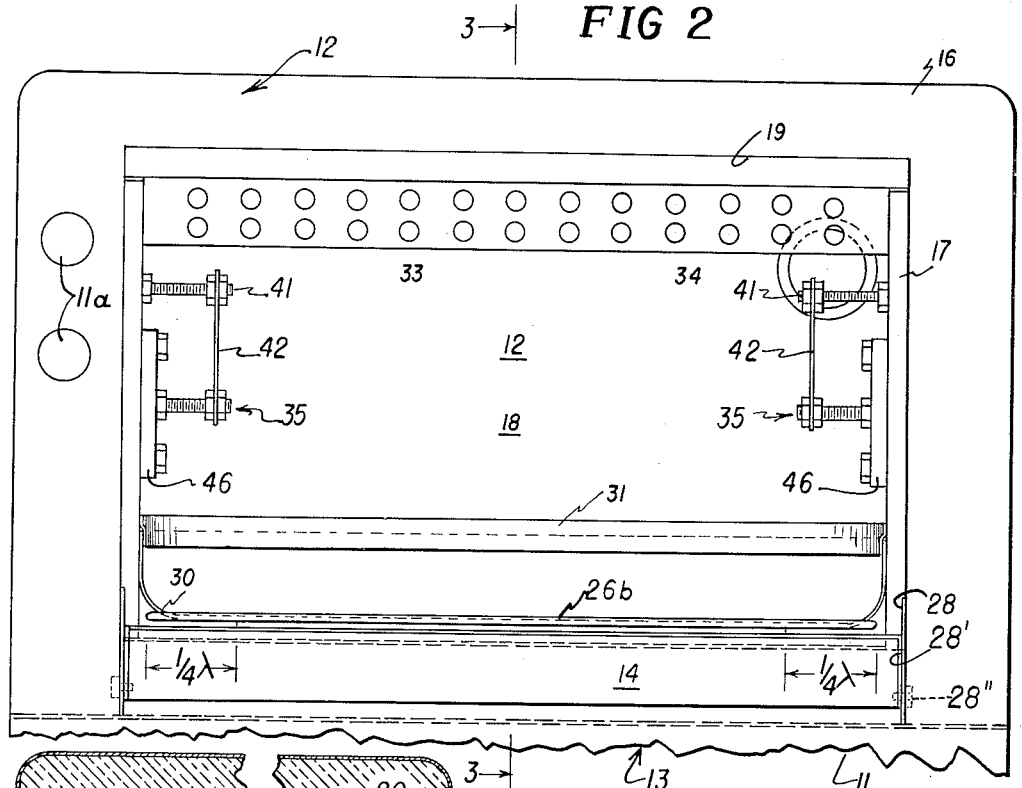
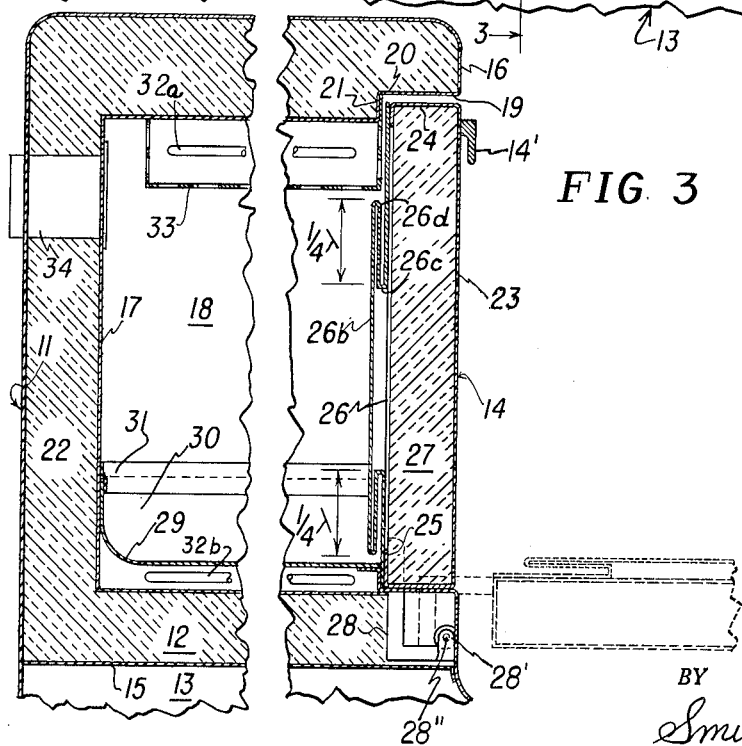
INVENTOR.
George W. Schroeder
BY
Smith, Olsen + Baird
Attys.

United States Patent Office 2,716,694
Patented Aug. 30, 1955

2,716,694

COMBINATION ELECTRIC AND ULTRA-HIGH FREQUENCY HEATING APPARATUS

George W. Schroeder, Sandy Hook, Conn., assignor to General Electric Company, a corporation of New York Application June 16, 1951, Serial No. 232,005

10 Claims. (Cl. 219—10.55)

The present invention relates to combination electric and ultra-high frequency heating apparatus and more particularly to such apparatus involved in the cooking of foods in an oven cavity.

A conventional ultra-high frequency cooking oven comprises a shielded oven cavity adapted to receive semi-conducting foods, such as bakery goods (cakes, pies, and the like) and roasts (meat, poultry and the like), a single antenna arranged adjacent to one side of the oven cavity, and an ultra-high frequency generator for supplying ultra-high frequency energy via an associated transmission line to the antenna. The antenna radiates ultra-high frequency electromagnetic or microwave energy into the oven cavity, whereby the food is permeated by the ultra-high frequency electric and magnetic fields causing a deep cooking effect therethrough. Also such a cooking oven frequently comprises an electric heating unit that is productive of electric radiant (infrared) energy so that a surface browning effect may be obtained upon the food.

It has now been discovered that the microwave energy radiated from the antenna behaves in a manner similar to the electric radiant (infrared) energy in that the power density thereof is reduced or attenuated as the microwave energy penetrates the food arranged in the oven cavity. In other words, the side of the food disposed toward and closer to the antenna cooks more rapidly and thoroughly than the opposite side of the food disposed away and more remote from the antenna, whereby the degree of cooking of the food from the raw state proceeds in a given time interval inversely with the distance thereof from the antenna. This nonuniform heating effect of the different portions of the mass of food, dependent upon the distances thereof from the antenna, is separate and distinct from the localized heating effect that is produced in the food by standing microwaves in the oven cavity. While this nonuniform heating effect is undesirable in the cooking of roasts, and the like, it is intolerable in the cooking of bakery goods, and the like.

Accordingly it is a general object of the present invention to provide cooking apparatus that is effective to minimize the nonuniform heating of the different portions of a mass of food undergoing an ultra-high frequency cooking operation in an oven cavity.

Another object of the invention is to provide cooking apparatus that involves a plurality of ultra-high frequency antennas disposed in an oven cavity in such a manner that the integral of the distances between any portion of a mass of food supported in the oven cavity and all of the antennas is substantially constant in order that all portions of the mass of food are substantially uniformly heated and cooked during a given time interval.

Another object of the invention is to provide in an ultra-high frequency oven an improved arrangement of a plurality of antennas in the oven cavity so as to obtain a more uniform heating effect therethrough.

A further object of the invention is to provide in a cooking oven, an improved arrangement of a plurality of ultra-high frequency antennas and an electric heating unit in the oven cavity so that both a deep cooking effect and a surface browning effect may be performed upon semi-conducting food arranged in the oven cavity without the induction of parasitic ultra-high frequency currents in the electric heating unit by the antennas.

A further object of the invention is to provide in an ultra-high frequency oven, an improved attenuator flue for venting the oven cavity without the escape therethrough of ultra-high frequency energy from the oven cavity.

A further object of the invention is to provide in an ultra-high frequency oven, an improved oven liner and door construction so that there is no escape of the ultra-high frequency energy from the oven cavity at the junction between the oven liner and the door when the door occupies its closed position.

A further object of the invention is to provide in an ultra-high frequency oven, a door for the access opening that is formed through the oven liner into the oven cavity that carries a one-quarter wave-length choke of the ultra-high frequency energy permeating the oven cavity so as to prevent the presence of an ultra-high frequency voltage between the oven liner and the door.

A further object of the invention is to provide in heating apparatus including a shielded cavity provided with ultra-high frequency energy from two antennas, a bifurcated transmission line disposed between the two antennas and an associated ultra-high frequency generator, that is so constructed and arranged that the characteristic impedance of the transmission line as a whole substantially matches that of the generator notwithstanding the bifurcation in the transmission line.

Further features of the invention pertain to the particular arrangement of the elements of the heating apparatus, whereby the above-outlined and additional operating features thereof are attained.

The invention, both as to its organization and method of operation, together with further objects and advantages thereof, will best be understood by reference to the following specification taken in connection with the accompanying drawings in which Figure 1 is a front elevational view of heating apparatus embodying the present invention; Fig. 2 is an enlarged fragmentary front elevational view of the upper portion of the heating apparatus shown in Fig. 1, the front door for the oven being illustrated in its open position; Fig. 3 is an enlarged fragmentary lateral sectional view of the upper portion of the heating apparatus, taken along the line 3—3 in Fig. 2, the front door for the oven being illustrated in solid lines in its closed position and in dotted lines in its open position; Fig. 4 is a somewhat enlarged plan view of the inner metal sheet carried by the front door; and Fig. 5 is a somewhat enlarged longitudinal sectional view taken through the heating apparatus shown in Fig. 1, with the casing removed, and illustrating the arrangement of the bifurcated transmission line between the two antennas disposed in the oven cavity and the associated ultra-high frequency generator of the magnetron type.

Referring now to Figs. 1 to 3, inclusive, of the drawings, the heating apparatus 10 there illustrated and embodying the features of the present invention comprises a cabinet or casing 11 housing a cooking oven 12 in the upper portion thereof and providing an apparatus compartment 13 in the lower portion thereof; the oven 12 being provided with an upper front door 14 and the apparatus compartment 13 being provided with a removable lower front panel 15. Further the front wall of the oven 12 carries various control and instrumentation devices schematically illustrated at 12a. As best shown in Figs. 2 and 3, an intermediate sheet metal partition 15 arranged within the casing 11 separates the upper oven 12 and the lower apparatus compartment 13; and the casing 11 is formed of sheet metal to provide the oven 12 with an outer metal shell 16. Further the oven 12 comprises a sheet metal liner 17 defining an oven cavity 18 therein; the shell 16 and the liner 17 are provided with communicating front access openings therein that cooperate to define a front doorway 19 communicating between the exterior and the oven cavity 18 and in which the door 14 is mounted and movable between a substantially vertically disposed closed position and a substantially horizontally disposed open position. More particularly the doorway 19 is substantially rectangular and is formed primarily from an inwardly directed flange 20 carried by the shell 16 and joining a cooperating flange 21 carried by the liner 17 so that the shell 16 and the liner 17 are electrically connected together in order that grounding of the casing 11 effects grounding of the liner 17. In the oven 12, the space between the shell 16 and the liner 17 is filled with a body of thermal insulating material 22, such as glass wool.

The front door 14 is also substantially rectangular and comprises an outer metal sheet 23 provided with a marginal flange 24 that terminates in an inwardly directed flange 25 and an inner metal sheet 26 carried by the inturned flange 25. In the door 14, the space between the outer sheet 23 and the inner sheet 26 is filled with a body of thermal insulating material 27, such as glass wool. The opposite sides of the marginal flange 24 of the door 14 directly carry longitudinal spaced-apart hinge leaves 28 that are in turn pivotally mounted upon cooperating longitudinal spaced-apart hinge leaves 28' carried by the shell 16, the pairs of hinge leaves 28 and 28' being pivotally mounted together by cooperating trunnions 28". Thus in the door 14, the outer sheet 23 is electrically connected to the inner sheet 26; and the door 14, as a whole, is electrically connected via the hinge leaves 28 and 28' to the casing 11 so that the door 14 is grounded when the casing 11 is externally grounded. As clearly illustrated in Fig. 3, when the door 14 occupies its closed position, the outer sheet 23 thereof is disposed substantially flush with the front of the shell 16 and the boundary portion of the inner sheet 26 engages and establishes electrical contact with the associated flange 21 disposed about the inside of the doorway 19 thereby establishing as far as possible, an electrical connection between the liner 17 and the inner sheet 26 of the door 14. Finally the door 14 carries a handle 14' adjacent to the upper central portion thereof in order to facilitate movements of the door 14 between its open and closed positions.

A substantially rectangular metal deck 29 is arranged within the lower portion of the oven cavity 18 above the bottom wall of the liner 17, the deck 29 terminating in upwardly directed rear and side flanges 30 supported directly in contact with the corresponding rear and side walls of the liner 17. The upper edges of the flanges 30 provided on the deck 29 are covered by a substantially U-shaped and downwardly directed metal trim element 31 secured to the corresponding rear and side walls of the liner 17. The bottom wall of the deck 29 is arranged substantially flush with the inner sheet 26 of the door 14 when the door 14 occupies its open position so as to render the bottom of the oven cavity readily accessible from the exterior and to provide for ready cleaning of the deck 29 when required. The trim element 31 lends a finished appearance to the interior of the oven cavity 18, provides an electric circuit between the liner 17 and the deck 29 and facilitates cleaning of these parts.

An electric heating unit 32a is arranged in the upper portion of the oven cavity 18 below the top wall of the liner 17 and is enclosed and shielded by a reticulated metal screen 33 of box-like structure and secured and electrically connected to the top wall of the liner 17.

Thus the screen 33 cooperating with the top wall of the liner 17 shields the electric heating unit 32a from the ultra-high frequency energy permeating the oven cavity 18, so as to prevent the induction of parasitic ultra-high frequency currents therein. Also the screen 33 accommodates the ready transmission of radiant infrared heat from the electric heating unit 32a downwardly into the oven cavity 18. Further an electric heating unit 32b is arranged below the oven cavity 18 between the deck 29 and the bottom wall of the liner 17. Thus the electric heating unit 32b effects heating of the deck 29 and the consequent heating of the lower portion of the oven cavity 18. The electric heating units 32a and 32b are preferably of the sheathed resistance conductor type; and electric circuits, not shown, are provided for the purpose of selectively controlling the supply of electric current thereto. Finally a substantially cylindrical metal flue 34 is arranged in an opening provided through the rear wall of the liner 17 and the rear wall of the shell 16 adjacent to the upper right-hand corner of the oven cavity 18 and communicating therefrom to the exterior in order to accommodate the venting of vapor and other cooking fumes from the oven cavity 18 to the exterior. The flue 34 is electrically connected to the rear wall of the liner 17 and to the rear wall of the shell 16 and constitutes an attenuator taking the form of a hollow conducting tube and constituting a section of wave guide having cross-sectional dimensions sufficiently small so as not to propagate the ultra-high frequency energy from the oven cavity 18 to the exterior.

As best shown in Figs. 2 and 5, the opposed end walls of the liner 17 are provided with substantially centrally disposed openings 17a therein through which opposed antennas 35 project into the oven cavity 18. More fundamentally the heating apparatus 10 comprises a coaxial transmission line 36, including an upstanding lower trunk 37 that is bifurcated adjacent to the upper end thereof to provide two oppositely directed and longitudinally extending arms 38 that are turned upwardly and then inwardly to embrace the opposed end walls of the liner 17.

More specifically the trunk 37 is arranged in the apparatus compartment 13 and the upwardly directed portions of the arms 38 project through longitudinally spaced-apart openings provided in the partition 15 into cooperating relation with respect to the end walls of the liner 17. The trunk 37 includes a tubular inner conductor 37a and a tubular outer conductor 37b; and likewise each of the two arms 38 includes a tubular inner conductor 38a and a tubular outer conductor 38b. The extreme ends of the tubular inner conductors 38a of the two arms 38 respectively carry central conductors 39 that are directed inwardly toward the two openings 17a respectively formed in the opposed end walls of the liner 17 and respectively support the two antennas 35. More particularly, each of the antennas 35 is of the loop type comprising a lower threaded stud 40 directly secured to the associated central conductor 39, and an upper threaded stud 41 directly secured to the associated end wall of the liner 17, and an intermediate section 42. This arrangement of each of the loop antennas 35 accommodates independent adjustment of the upper and lower ends of the intermediate section 42 upon the associated studs 40 and 41, whereby the pattern of the microwave energy radiated from each antenna 35 into the oven cavity 18 may be varied.

Again considering the construction of the coaxial transmission line 36, the outer conductor 37b of the trunk 37 comprises a series of flanged lengths that are suitably mechanically and electrically secured together by flanged couplings 43; and the outer conductor 38b of each of the arms 38 comprises a series of flanged lengths that are suitably mechanically and electrically secured together by flanged couplings 44. The extremity of the outer conductor 38b of each of the arms 38 terminates in a flange 45 that is mechanically and electrically secured to the associated end wall of the liner 17 by an arrangement including a ring 46 and a series of bolts 47, the flange 45 and the ring 46 being respectively disposed exteriorly and interiorly of the associated end wall of the liner 17. The inner conductor 38a of each of the arms 38 includes a number of sections that are respectively secured together by intervening interiorly arranged ferrules 48. Further the inner conductor 38a and the outer conductor 38b in each of the arms 38 are arranged and retained in spaced-apart relation by a series of rings 49 formed of a suitable dielectric material. Finally a similar ring 50 formed of dielectric material is arranged between the central conductor 39 and the surrounding portion of the outer conductor 38b in each of the arms 38 adjacent to the associated opening 17a in the end wall of the liner 17 in order to serve as a thermal barrier preventing heat and vapor and fumes from the oven cavity 18 from entering the adjacent end of the arm 38. Recapitulating, it will be understood that in the trunk 37, the inner conductor 37a is insulated from the outer conductor 37b and is electrically connected to the inner conductor 38a of each of the two arms 38; that in each of the two arms 38, the inner conductor 38a is insulated from the outer conductor 38b and is electrically connected to the associated central conductor 39; and that each of the central conductors 39 is electrically connected to the associated one of the studs 40 of the associated antenna 35. In each of the two antennas 35, the intermediate section 42 is electrically connected at its opposite ends to the respective studs 40 and 41; and the stud 41 is electrically connected to the liner 17. Further in the trunk 37, the outer conductor 37b is electrically connected to the outer conductor 38b of each of the two arms 38; and the outer conductor 38b of each of the two arms 38 is electrically connected to the adjacent end wall of the liner 17.

Further the apparatus 10 comprises an oscillator disposed in the apparatus compartment 13 and including the transmission line 36 and an ultra-high frequency generator 51 of the magnetron tube type. The magnetron tube 51 is of conventional construction and arrangement comprising an evacuated housing formed at least in part by an external tubular metal anode 52 and associated insulating glass seals 53 and 54 arranged at the opposite upper and lower ends of the anode 52. A power output terminal 55 is centrally secured in place in the upper end seal 53 and extends from the interior of the housing to the exterior; a coupler in the form of a loop antenna 56 is arranged within the housing and electrically connected between the power output terminal 55 and the anode 52, in the usual manner. An electron emissive cathode 57 is arranged within the housing along the central portion of the anode 52 and provided with terminals that are respectively electrically connected to a cathode sealing arrangement, including inner and outer conductors 58 and 59 secured in place in the lower end seal 54. Further the tubular anode 52 carries the usual external sleeve-like magnet coil 60. Finally the interior of the tubular anode 52 is provided with the usual resonant chambers, not shown; and it will be understood that the magnetron tube 51 is capable of oscillating to produce an ultra-high frequency of the order of 1000 megacycles. The circuit control system for governing operation of the magnetron tube 51 is not disclosed in the interest of brevity, as it may be of a conventional type; however, it is preferable that this circuit control system for the magnetron tube 51 be of the connection and arrangement of that disclosed in the copending application of George W. Schroeder, Serial No. 221,630, filed April 18, 1951.

Finally the magnetron tube 51 is operatively connected to the adjacent end of the trunk 37 of the transmission line 36 by an arrangement, including first and second detachable connectors 61 and 62. The detachable connector 61 may take the form of a resilient ball and socket joint between the extremity of the inner conductor 37a of the trunk 37 and the power output terminal 55 of the magnetron tube 51; and the detachable connector 62 may take the form of a resilient ring disposed between the extremity of the outer conductor 37b of the trunk 37 and the upper portion of the anode 52 of the magnetron tube 51. In any case the connectors 61 and 62 are preferably of the quick detachable type and respectively connect the power output terminal 55 and the anode 52 of the magnetron tube 51 respectively to the inner conductor 37a and the outer conductor 37b of the trunk 37. Further it will be understood that when the magnetron tube 51 is operated an ultra-high frequency voltage is present between the power output terminal 55 and the anode 52 and consequently microwave energy is delivered to the two antennas 35, whereby the two antennas 35 radiate the microwave energy within the oven cavity 18.

The magnetron tube 51 has a characteristic impedance Z, whereby it is necessary to match thereto the impedance of the transmission line 36 and the antennas 35 in the oven cavity 18. Now since the cross-sectional dimensions of the trunk 37 are substantially identical to the cross-sectional dimensions of the arms 38, the transmission line 36 would have a characteristic impedance that is equal to only one-half of that of the magnetron tube 51 if it were not for the provision in each of the arms 38 of sleeve transformers 63. More particularly each of the sleeve transformers 63 comprises a metal sleeve tightly fitting over the inner conductor 38a of the associated arm 38, each of the metal sleeves having a one-quarter wave length of the ultra-high frequency energy transmitted by the transmission line 36, and the end of each of the sleeves adjacent to the center of the inner conductor 37a of the trunk 37 is displaced therefrom by a distance of one-quarter wave length of the ultra-high frequency energy noted. Thus each of the sleeve transformers 63 is so designed that the characteristic impedance of the associated arm 38 is increased to twice that of the trunk 37 so that the transmission line as a whole has a characteristic impedance Z that matches that of the magnetron tube 51. Finally the arrangement permitting adjustment of the central sections 42 of each of the antennas 35 permit the establishment of characteristic impedances of the two antennas 35 so that the two antennas 35 arranged in parallel or multiple relation match the characteristic impedance Z of the transmission line 36 and the magnetron tube 51.

The lower portion of the trunk 37 carries a one-quarter wave length stub 64 including a tubular inner conductor 64a, a tubular outer conductor 64b, and a short-circuiting plate 64c. The tubular inner conductor 64a of the stub 64 communicates with and is electrically connected to the tubular inner conductor 37a of the trunk 37; and the tubular outer conductor 64b of the stub 64 communicates with and is electrically connected to the tubular outer conductor 37b of the trunk 37; and the short-circuiting plate 64c is spaced one-quarter wave length of the microwave energy in the trunk 37 from the center line of the inner conductor 37a thereof and electrically connects the outer end of the outer conductor 64b of the stub 64 to the adjacent wall of the inner conductor 64a of the stub 64. The upper portion of the trunk 37 carries an attenuator 65 that may take the form of a length of hollow conducting tubing 66, the inner end of the tubing 66 being electrically joined to the outer conductor 37b of the trunk 37. The attenuator 65 constitutes a section of wave guide having cross-sectional dimensions sufficiently small so as not to propagate waves of the frequency in the trunk 37 to the exterior, the attenuator 65 communicating between the interior of the outer conductor 37b of the trunk 37 and the exterior. The lower end of the inner conductor 37a has an opening 37c therein adjacent to the connector 61; and a plug 66' is arranged in the intermediate portion of the tubular inner conductor 37a of the trunk 37 above the tubular inner conductor 64a of the stub 64. In view of the foregoing, it will be understood that a suitable insulating cooling medium, such as air, may be forced under pressure through the tubular inner conductor 64a of the stub 64 from the exterior, whereby the air noted will pass downwardly in the tubular inner conductor 37a of the trunk 37 below the plug 66' and out of the opening 37c provided in the lower end of the tubular inner conductor 37a. The air noted then passes over the power output terminal 55 and the end seal 53 of the magnetron tube 51 effecting cooling thereof, and then rises in the tubular outer conductor 37b of the trunk 37 and ultimately passes through the attenuator 65 to the exterior, the barriers 49 preventing passage of the air noted through the outer conductors 38b of the arms 38. This arrangement for cooling the power output terminal 55 and the associated end seal 53 of the magnetron tube 51 is very advantageous as it affords adequate cooling thereof without the escape of the microwave energy from the trunk 37. In passing, it is noted that the power output terminal 55 and the adjacent end seal 53 of the magnetron tube 51 have a tendency to become heated when the reflected ultra-high frequency power becomes excessive as a consequence of an impedance mismatch between the antennas 35 and the load that is adapted to be heated in the oven cavity 18. While the cooling arrangement above described will not entirely prevent damage to the magnetron tube 51 in the event of a severe mismatch between the impedance of the magnetron tube 51 and the impedance of the load in the oven cavity 18, it is helpful and it does conduct away heat in the short time interval while the associated power supply circuit is making the necessary adjustments of the ultra-high frequency power level of the magnetron tube 51 in the event the power control circuit disclosed in the previously mentioned copending application of George W. Schroeder is employed for the purpose of governing operation of the magnetron tube 51.

Considering now the operation of the heating apparatus 10, it will be understood that a suitable load comprising food that is to be cooked is placed in the oven cavity 18 upon the bottom wall of the deck 29 and that the door 14 is operated into its closed position. Operation of the magnetron tube 51 is initiated, whereby the antennas 35 radiate the supplied microwave energy into the oven cavity 18 producing a deep cooking effect upon the mass of food supported by the bottom wall of the deck 29 and constitutes the load. Since the antennas 35 are disposed on opposite sides of the mass of food being cooked, the food being normally supported upon the central portion of the bottom wall of the deck 29, the integral of the distances between any portion of the mass of food and the two antennas 35 is substantially constant in order that all portions of the mass of food are substantially uniformly heated and cooked during the time interval of operation of the heating apparatus 10. This method of heating the mass of food overcomes the normal tendency to effect a disproportional heating and cooking of one side of the mass of food adjacent to the associated antenna, in view of the fact that there is a definite reduction or attenuation of the power density of the microwave energy as it penetrates the mass of food. In accordance with the present method, all portions of the mass of food are cooked at a substantially uniform rate from the raw state as time proceeds and substantially independent of the distance thereof from the associated antenna 35 by virtue of the integrating effects produced by the two opposed antennas 35. Specifically the portion of the food disposed on the left-hand side of the mass is disproportionately cooked by the associated left-hand antenna 35 with respect to the right-hand antenna 35; whereas a contrary cooking effect is produced on the right-hand side portion of the mass of food by the respective right-hand and left-hand antennas 35. Finally the intermediate portion of the mass of food is cooked more or less uniformly by both of the antennas 35. In any case the cooking effects of the two antennas 35 are integrated due to the angular disposition thereof with regard to the mass of food, whereby the resulting deep cooking effect produced in any portion of the mass of food is far more nearly uniform than in a method employing only one antenna.

In order to obtain a surface browning effect upon the mass of food, the electric heating unit 32a may be supplied with electric heating current, whereby radiant infrared heat is projected downwardly from the electric heating unit 32a through the perforated screen 33 into the oven cavity 18. Also the electric heating unit 32b may be supplied with electric heating current so as to heat the deck 29, whereby radiant infrared heat is projected upwardly therefrom through the oven cavity 18. If desired, the electric heating units 32a and 32b may be supplied with electric energy in order to preheat the oven cavity 18 just prior to the initiation of operation of the magnetron tube 51. In this manner, the mass of food supported upon the deck 29 may be ultimately thoroughly and substantially uniformly cooked and browned by the combination of the microwave energy radiated from the two antennas 35 and by the radiant infrared energy supplied by the electric heating units 32a and 32b.

During the operation of the heating apparatus 10, there is a tendency for the microwave energy in the oven cavity 18 to induce a corresponding ultra-high frequency voltage in the inner sheet 26 of the door 14 and notwithstanding the precautions that are taken with regard to grounding together the inner sheet 26 upon the outer sheet 23 of the door 14, the grounding of the door 14 upon the casing 11 and the grounding of the inner sheet 26 of the door 14 upon the liner 17. In order to prevent this induction of an ultra-high frequency voltage between the inner sheet 26 of the door 14 and the liner 17 and the consequent production of an ultra-high frequency voltage between the door 14 and the shell 16 with the consequent propagation of ultra-high frequency energy out of the doorway 19 to the exterior, an arrangement is provided that consists of a one-quarter wave length choke of the ultra-high frequency energy permeating the oven cavity 18 and carried by the inner sheet 26 of the door 14. More particularly referring to Figs. 2, 3 and 4, it will be observed that the inner sheet 26 comprises an outer rectangular boundary section 26a, an inwardly disposed and rearwardly spaced rectangular central section 26b and a connecting centrally disposed rectangular throat section 26c. More particularly the central section 26b is folded back upon itself as indicated at 26d and joins the throat section 26c, and the boundary section 26a, appropriately mitered, as indicated at 26e, adjacent to the four corners thereof, to provide a continuous structure. As clearly illustrated in Figs. 3 and 4, the top of the boundary section 26a extends outwardly beyond the top marginal edge of the central section 26b in order that the top marginal edge of the central section 26b is disposed below the bottom wall of the reticulated screen 33 when the door 14 occupies its closed position; the bottom boundary section 26a extends outwardly beyond the bottom marginal edge of the central section 26b in order that the bottom marginal edge of the center section 26b is disposed above the bottom wall of the deck 29 when the door 14 occupies its closed position; and the sides of the boundary section 26a respectively extend outwardly beyond the side marginal edges of the central section 26b in order that the side marginal edges of the central section 26b are disposed inwardly with respect to the respective side walls of the liner 17 when the door 14 occupies its closed position. Thus it will be understood that when the door 14 occupies its closed position that the boundary section 26a of the inner sheet 26 engages and establishes electrical contact as far as possible with the adjacent junction between the liner 17 and the shell 16 about the doorway 19, that the central portion 26b of the inner sheet 26 is disposed inwardly with respect to the inner portion of the doorway 19 and in spaced-apart relation with respect to the adjacent bottom wall of the reticulated screen 33, the surrounding wall of the deck 29 and the side walls of the liner 17. As illustrated in Figs. 3 and 4, the distance between the marginal edge of the central section 26b and the adjacent portion of the throat section 26c on each of the four sides of the central section 26b is equivalent to substantially one-quarter wave length of the microwave energy permeating the cavity 18, whereby the structure noted constitutes a one-quarter wave length choke about the inner portion of the doorway 19 carried by the inner sheet 26 and disposed between the inner sheet 26 and the surrounding metal walls of the liner 17, the reticulated screen 33 and the deck 29.

Thus any ultra-high frequency voltage that is induced between the central section 26b of the inner sheet 26 of the door 14 and the junction between the shell 16 and the liner 17 is distributed between the impedance of the one-quarter wave length choke and the impedance of the abutting connection between the boundary section 26a of the inner sheet 26 of the door 14 and the junction between the shell 16 and the liner 17 in proportion to the two impedances. Now since the impedance of the one-quarter wave length choke is virtually infinite, as it is substantially equivalent to an open circuit to the ultra-high frequency voltage noted, virtually all of the voltage drop occurs across the one-quarter wave length choke, whereby there is virtually no ultra-high frequency voltage drop across the abutting connection between the boundary section 26a of the inner sheet 26 of the door 14 and the junction between the shell 16 and the liner 17. Since the presence of an ultra-high frequency voltage drop between the boundary section 26a of the inner sheet 26 of the door 14 and the junction between the shell 16 and the liner 17 is prevented by the one-quarter wave length choke construction, there is no arcing about the boundary section 26a of the inner sheet 26 of the door 14, and propagation of the ultra-high frequency energy out of the doorway 19 is positively eliminated.

In view of the foregoing, it is apparent that there has been provided improved apparatus for carrying out cooking and heating operations employing ultra-high frequency electromagnetic energy, as well as a cooking oven of improved and simplified construction and arrangement.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An ultra-high frequency oven comprising a metal oven liner defining an oven cavity, said oven liner having a passage and a hole and an access opening formed therein, means including an antenna projecting through said hole into said cavity for radiating ultra-high frequency energy thereinto, means including an attenuator wave-guide flue connected to said oven liner and communicating with said cavity through said passage for venting said cavity to the exterior, a door mounted for movements between open and closed positions with respect to said access opening, a metal door liner carried by said door and establishing electrical contact with said oven liner when said door occupies its closed position, and means including a choke of ¼ wave length of the ultra-high frequency energy permeating said cavity carried by said door liner for preventing the escape of ultra-high frequency energy from said access opening when said door occupies its closed position, said choke including a metal plate carried by said door liner and movable therewith and electrically connected thereto, said plate being spaced laterally inwardly with respect to the central portion of said door liner and disposed in said cavity adjacent to said access opening and spaced radially inwardly from said oven liner when said door occupies its closed position.

2. An ultra-high frequency oven comprising a metal oven liner defining an oven cavity, said oven liner having a passage and a hole and an access opening formed therein, means including an antenna projecting through said hole into said cavity for radiating ultra-high frequency energy thereinto, means including a coaxial transmission line provided with an inner conductor connected to said antenna and an outer conductor connected to said oven liner and surrounding said passage for supplying ultra-high frequency energy to said antenna, a thermal insulating barrier arranged in said transmission line adjacent to said passage and closing the space between said inner and outer conductors, means including an attenuator wave-guide flue connected to said oven liner and communicating with said cavity through said passage for venting said cavity to the exterior, a door mounted for movements between open and closed positions with respect to said access opening, a metal door liner carried by said door and establishing electrical contact with said oven liner when said door occupies its closed position, and means including a choke of ¼ wave length of the ultra-high frequency energy permeating said cavity carried by said door liner for preventing the escape of ultra-high frequency energy from said access opening when said door occupies its closed position, said choke including a metal plate carried by said door liner and movable therewith and electrically connected thereto, said plate being spaced laterally inwardly with respect to the central portion of said door liner and disposed in said cavity adjacent to said access opening and spaced radially inwardly from said oven liner when said door occupies its closed position.

3. An ultra-high frequency oven comprising a metal oven liner defining an oven cavity, said oven liner having two holes and an access opening formed therein and mutually spaced-apart, two antennas respectively projecting through said two holes into said cavity, an ultra-high frequency generator electrically connected in multiple to said two antennas, a door mounted for movements between open and closed positions with respect to said access opening, a metal door liner carried by said door and establishing electrical contact with said oven liner when said door occupies its closed position, and means including a choke of ¼ wave length of the ultra-high frequency energy permeating said cavity carried by said door liner adjacent to said oven liner for preventing the escape of ultra-high frequency energy from said access opening when said door occupies its closed position, said choke including a metal plate carried by said door liner and movable therewith and electrically connected thereto, said plate being spaced laterally inwardly with respect to the central portion of said door liner and disposed in said cavity adjacent to said access opening and spaced radially inwardly from said oven liner when said door occupies its closed position.

4. An ultra-high frequency oven comprising a metal oven liner including top and bottom and rear and two opposed end walls defining an oven cavity having a front access opening, said two end walls having two opposed holes formed therein, two opposed antennas respectively projecting through said two holes into the respective ends of said cavity, an ultra-high frequency generator electrically connected in multiple to said two antennas, a front door mounted for movements between open and closed positions with respect to said front access opening, a metal door liner carried by said front door and establishing electrical contact with the adjacent front portions of said top and said bottom and said end walls when said front door occupies its closed position, and means including a choke of ¼ wave length of the ultra-high frequency energy permeating said cavity carried by said door liner adjacent to the front portions of said top and said bottom and said end walls for preventing the escape of ultra-high frequency energy from said front access opening when said front door occupies its closed position, said choke including a metal plate carried by said door liner and movable therewith and electrically connected thereto, said plate being spaced laterally inwardly with respect to the central portion of said door liner and disposed in the front portion of said cavity adjacent to said front access opening and spaced radially inwardly from said oven liner when said front door occupies its closed position.

5. In ultra-high frequency heating apparatus including metal wall structure defining a cavity having an access opening thereinto, a closure member operatively associated with said access opening, and means for permeating said cavity with ultra-high frequency energy when said closure member occupies its closed position; the combination comprising an inner metal sheet carried by said closure member and engaging and establishing electrical contact with said wall structure when said closure member occupies its closed position, and means including a choke of ¼ wave length of the ultra-high frequency energy permeating said cavity carried by said sheet adjacent to said wall structure for preventing the presence of an ultra-high frequency voltage between said wall structure and said sheet when said closure member occupies its closed position, said choke including a metal plate carried by said door liner and movable therewith and electrically connected thereto, said plate being spaced laterally inwardly with respect to the central portion of said door liner and disposed in said cavity adjacent to said access opening and spaced radially inwardly from said oven liner when said door occupies its closed position.

6. In ultra-high frequency heating apparatus including metal wall structure defining a cavity having an access opening thereinto, a closure member operatively associated with said access opening, and means for permeating said cavity with ultra-high frequency energy when said closure member occupies its closed position; the combination comprising an inner metal sheet carried by said closure member and including a boundary section and a central section and a connecting throat section, said boundary section and said central section being respectively disposed in two substantially parallel laterally spaced-apart planes and the marginal portion of said central section projecting radially beyond said throat section over said boundary section, the radial distance between the marginal portion of said central section and the adjacent portion of said throat section being substantially ¼ wave length of the ultra-high frequency energy permeating said cavity, the lateral distance between said boundary section and said central section being substantially less than ¼ wave length of the ultra-high frequency energy permeating said cavity, said boundary section engaging and establishing electrical contact with said wall structure when said closure member occupies its closed position, said central section being disposed within said cavity and spaced radially inwardly from said wall structure by a distance substantially less than ¼ wave length of the ultra-high frequency energy permeating said cavity when said closure member occupies its closed position.

7. In ultra-high frequency heating apparatus including metal wall structure defining a cavity having a front access opening thereinto, a front door mounted for movements between open and closed positions with respect to said front access opening, and means for permeating said cavity with ultra-high frequency energy when said front door occupies its closed position; the combination comprising an inner metal sheet carried by said front door and including a boundary section and a central section and a connecting throat section, said boundary section and said central section being respectively disposed in two substantially parallel laterally spaced-apart planes and the marginal portion of said central section projecting radially beyond said throat section over said boundary section, the radial distance between the marginal portion of said central section and the adjacent portion of said throat section being substantially ¼ wave length of the ultra-high frequency energy permeating said cavity, the distance between said boundary section and said central section being substantially less than ¼ wave length of the ultra-high frequency energy permeating said cavity, said boundary section engaging and establishing electrical contact with said wall structure when said front door occupies its closed position, said central section being disposed within said cavity and spaced radially inwardly from said wall structure by a distance substantially less than ¼ wave length of the ultra-high frequency energy permeating said cavity when said front door occupies its closed position.

8. The ultra-high frequency heating apparatus combination set forth in claim 7 wherein said front access opening and said front door and said boundary section and said central section and said throat section are substantially rectangular, and wherein said boundary section engages the front marginal portion of said wall structure surrounding said front access opening when said front door occupies its closed position.

9. An ultra-high frequency oven comprising an inner metal liner defining an oven cavity having a front access opening, an outer metal shell enclosing said liner and spaced therefrom and having a front access opening, the portion of said liner surrounding the front access opening therein and the portion of said shell surrounding the front access opening therein being electrically connected together to define an upstanding front doorway into said oven cavity, a first body of thermal insulation arranged between said liner and said shell, a front door provided with inner and outer metal sheets arranged in spaced-apart relation and electrically connected together, a second body of thermal insulation arranged between said sheets, means for mounting said front door in said doorway for movements between a substantially vertical closed position and a substantially horizontal open position, said inner sheet engaging and establishing electrical contact with the junction between said liner and said shell when said front door occupies its closed position, said outer sheet being disposed substantially flush with the front portion of said shell when said front door occupies its closed position, means for permeating said oven cavity with ultra-high frequency energy when said front door occupies its closed position, and means including a choke of ¼ wave length of the ultra-high frequency energy permeating said oven cavity carried by said inner sheet adjacent to said liner for preventing the escape of the ultra-high frequency energy out of said doorway when said front door occupies its closed position, said choke including a metal plate carried by said door liner and movable therewith and electrically connected thereto, said plate being spaced laterally inwardly with respect to the central portion of said door liner and disposed in the front portion of said cavity within said doorway and spaced radially inwardly from said oven liner when said front door occupies its closed position.

10. A heating oven comprising an inner metal liner defining an oven cavity having a front access opening, an outer metal shell enclosing said liner and spaced therefrom and having a front access opening, the portion of said liner surrounding the front access opening therein and the portion of said shell surrounding the front access opening therein being electrically connected together to define an upstanding front doorway into said oven cavity, a first body of thermal insulation arranged between said liner and said shell, a front door provided with inner and outer metal sheets arranged in spaced-apart relation and electrically connected together, a second body of thermal insulation arranged between said sheets, means for mounting said front door in said doorway for movements between a substantially vertical closed position and a substantially horizontal open position, said inner sheet engaging and establishing electrical contact with the junction between said liner and said shell when said front door occupies its closed position, said outer sheet being disposed substantially flush with the front portion of said shell when said front door occupies its closed position, means for permeating said oven cavity with ultra-high frequency energy when said front door occupies its closed position, an electric heating unit arranged in the upper portion of said oven cavity adjacent to the top wall of said liner, a reticulated metal screen arranged in the upper portion of said oven cavity and cooperating with the top wall of said liner to shield said heating unit from the ultra-high frequency energy permeating said oven cavity, and a metal deck arranged in the lower portion of said oven cavity and electrically connected to the rear and side walls of said liner, said deck being disposed substantially flush with said inner sheet when said front door occupies its open position.

References Cited in the file of this patent

UNITED STATES PATENTS

| Number | Name | Date |
|---|---|---|
| 1,874,966 | Green | Aug. 30, 1932 |
| 2,159,872 | Conklin et al. | May 23, 1939 |
| 2,450,763 | McNall | Oct. 5, 1948 |
| 2,454,370 | Beaubien | Nov. 23, 1948 |
| 2,467,230 | Revercomb et al. | Apr. 12, 1949 |
| 2,468,127 | Smith | Apr. 26, 1949 |
| 2,491,687 | Nutt | Dec. 20, 1949 |
| 2,500,676 | Hall et al. | Mar. 14, 1950 |
| 2,556,597 | Pierson | June 12, 1951 |
| 2,569,775 | Pearce | Oct. 2, 1951 |
| 2,576,519 | Kopp | Nov. 27, 1951 |
| 2,586,754 | Wild | Feb. 19, 1952 |
| 2,591,695 | Hansen | Apr. 8, 1952 |
| 2,593,067 | Spencer | Apr. 15, 1952 |
| 2,597,825 | Schroeder | May 20, 1952 |
| 2,602,856 | Rumsey | July 8, 1952 |
| 2,632,090 | Revercomb et al. | Mar. 17, 1953 |